United States Patent
Ji et al.

(10) Patent No.: US 11,194,687 B2
(45) Date of Patent: Dec. 7, 2021

(54) CONTROLLER AND OPERATION METHOD THEREOF

(71) Applicant: SK hynix Inc., Gyeonggi-do (KR)

(72) Inventors: You-Min Ji, Gyeonggi-do (KR); Bum-Ho Kim, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 90 days.

(21) Appl. No.: 16/671,853

(22) Filed: Nov. 1, 2019

(65) Prior Publication Data

US 2020/0210303 A1 Jul. 2, 2020

(30) Foreign Application Priority Data

Jan. 2, 2019 (KR) ........................ 10-2019-0000316

(51) Int. Cl.
*G06F 11/30* (2006.01)
*G06F 11/10* (2006.01)

(52) U.S. Cl.
CPC ...... *G06F 11/3058* (2013.01); *G06F 11/1048* (2013.01)

(58) Field of Classification Search
CPC .......................... G06F 11/3058; G06F 11/1048
USPC ................ 714/721, 718, 719, 764, 768, 773
See application file for complete search history.

(56) References Cited

U.S. PATENT DOCUMENTS

| | | | | |
|---|---|---|---|---|
| 8,612,830 | B2* | 12/2013 | Kitahara | G06F 11/1068 714/764 |
| 10,318,200 | B2* | 6/2019 | Lee | G06F 3/0619 |
| 2008/0222483 | A1* | 9/2008 | Ito | G06F 11/106 714/754 |
| 2014/0032941 | A1* | 1/2014 | Kajigaya | G11C 11/4096 713/300 |
| 2014/0245105 | A1* | 8/2014 | Chung | G06F 11/1076 714/763 |
| 2015/0043284 | A1* | 2/2015 | Sakuma | G11C 16/349 365/185.25 |
| 2015/0055406 | A1* | 2/2015 | Andre | G11C 11/1675 365/158 |
| 2017/0177226 | A1* | 6/2017 | Lee | G06F 1/3287 |
| 2017/0271020 | A1* | 9/2017 | Zeng | G06F 11/076 |
| 2019/0004964 | A1* | 1/2019 | Kanno | G06F 3/064 |
| 2019/0050048 | A1* | 2/2019 | Kang | G06F 1/3275 |

FOREIGN PATENT DOCUMENTS

| | | |
|---|---|---|
| KR | 10-2012-0100705 | 9/2012 |
| KR | 10-1565564 | 11/2015 |
| KR | 10-1653999 | 9/2016 |

\* cited by examiner

*Primary Examiner* — John J Tabone, Jr.
(74) *Attorney, Agent, or Firm* — IP & T Group LLP

(57) ABSTRACT

Provided is a controller for controlling a memory device. The controller may include a media scanner suitable for performing a media scan operation of reading a predetermined size of data from the memory device in a predetermined cycle, detecting an error of the read data, generating corrected data of the read data, and storing the corrected data in the memory device, a period calculator suitable for calculating a power-off period, and a media scan controller suitable for changing the predetermined cycle according to the power-off period.

20 Claims, 12 Drawing Sheets

CONTROLLER AND OPERATION METHOD THEREOF

CROSS-REFERENCE TO RELATED APPLICATION

This application claims priority under 35 U.S.C. § 119 to Korean Patent Application No. 10-2019-0000316 filed on Jan. 2, 2019, which is incorporated herein by reference in its entirety.

BACKGROUND

1. Field

Various embodiments relate to a controller, and more particularly, to a controller for controlling a memory device, and an operation method thereof.

2. Discussion of the Related Art

The computer environment paradigm has been transitioning to ubiquitous computing, which enables computing systems to be used anytime and anywhere. As a result, use of portable electronic devices such as mobile phones, digital cameras, and laptop computers has rapidly increased. These portable electronic devices generally use a memory system having one or more memory devices for storing data. A memory system may be used as a main data storage device or an auxiliary memory device of a portable electronic device.

Since memory systems have no moving parts, memory systems provide advantages such as excellent stability and durability, high information access speed, and low power consumption. Examples of memory systems having such advantages include universal serial bus (USB) memory devices, memory cards having various interfaces, and solid-state drives (SSD).

SUMMARY

Various embodiments of the present invention are directed to a controller capable of improving the reliability of data stored in a memory device, and an operation method thereof.

In an embodiment, there is provided a controller for controlling a memory device. The controller may include: a media scanner suitable for performing a media scan operation of reading a predetermined size of data from the memory device in a predetermined cycle, detecting an error of the read data through a data validation component, generating corrected data of the read data, and storing the corrected data in the memory device depending on whether the number of bits contained in the detected error exceeds a predetermined threshold value; and a media scan controller suitable for changing the predetermined cycle according to a power-off period.

In an embodiment, there is provided an operation method of a controller for controlling a memory device. The operation method may include: performing a media scan operation in a predetermined cycle includes: reading a predetermined size of data from the memory device in the predetermined cycle; detecting an error of the read data, and generating corrected data of the read data; and storing the corrected data in the memory device according to whether the number of detected error bits exceeds a predetermined threshold value.

In an embodiment, there is provided a controller for a memory device. The controller may be configured to perform a media scan operation as a background operation for preventing an occurrence of an uncorrectable error in the memory area; and change the predetermined cycle according to a power-off period, wherein the media scan operation includes: reading a predetermined size of data from the memory device in a predetermined cycle;

These and other features and advantages of the present invention will become understood by those with ordinary skill in the art of the present invention from the following detailed description in conjunction with the following drawings.

DETAILED DESCRIPTION

Hereafter, various embodiments of the present invention will be described with reference to the accompanying drawings. It should be noted that the following descriptions will be focused on portions required for understanding an operation in accordance with an embodiment, and descriptions of other portions will be omitted in order not to unnecessarily obscure the subject matter of the present invention disclosure.

It is also noted that features described with one embodiment may be combined with features described with another embodiment without departing from the scope of the present invention. It is noted that reference to "an embodiment," "another embodiment" or the like does not necessarily mean only one embodiment, and different references to any such phrase are not necessarily to the same embodiment(s).

As used herein, singular forms may include the plural forms as well and vice versa, unless the context clearly indicates otherwise. The articles 'a' and 'an' as used in this application and the appended claims should generally be construed to mean 'one or more' unless specified otherwise or it is clear from the context to be directed to a singular form.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present. Communication between two elements, whether directly or indirectly connected/coupled, may be wired or wireless, unless stated or the context indicates otherwise.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

Hereafter, various embodiments of the present invention will be described in more detail with reference to the accompanying drawings.

Figure 1:
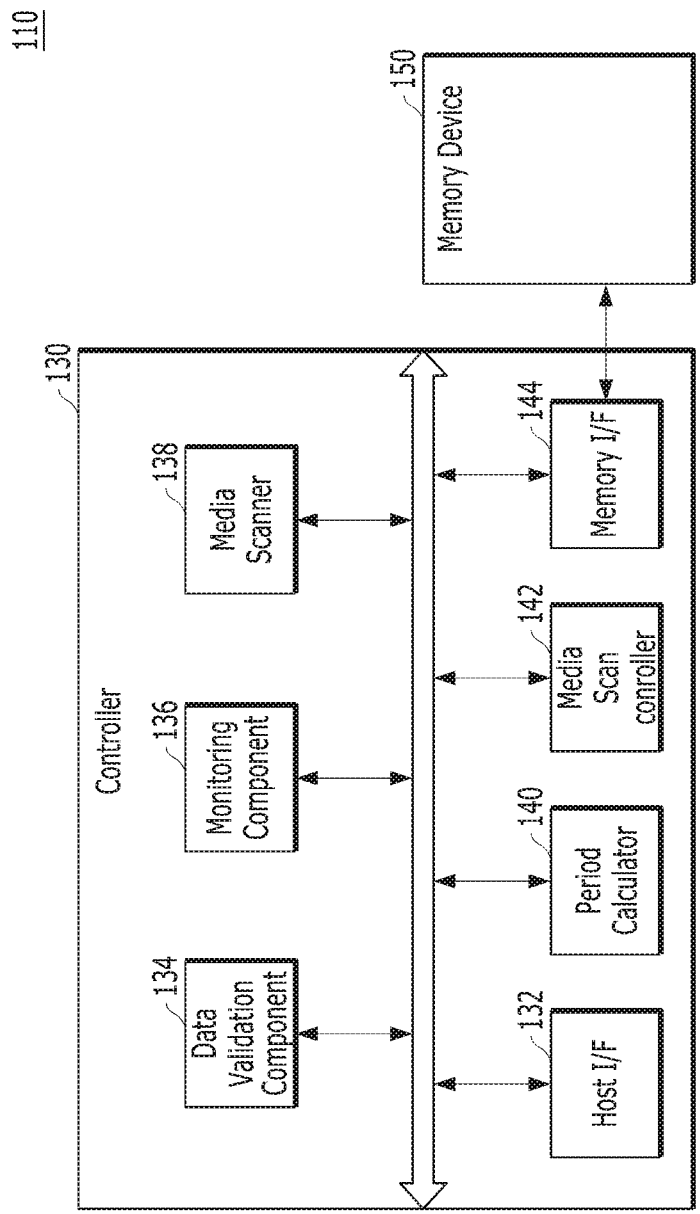
FIG. 1 schematically illustrates a structure of a memory system in accordance with an embodiment of the present invention.

FIG. 1 schematically illustrates a structure of a memory system 110 in accordance with an embodiment of the present invention.

The memory system 110 may store data or output data stored therein, according to a request of a host. The memory system 110 may be used as a main data storage device or a secondary data storage device of the host.

The memory system 110 may operate to store data for the host in response to a request received from a host (not shown). Non-limiting examples of the memory system 110 may include a solid-state drive (SSD), a multi-media card (MMC), a secure digital (SD) card, a universal storage bus (USB) device, a universal flash storage (UFS) device, a compact flash (CF) card, a smart media card (SMC), a personal computer memory card international association (PCMCIA) card and a memory stick. The MMC may include an embedded MMC (eMMC), a reduced size MMC (RS-MMC) and a micro-MMC. The SD card may include a mini-SD card and a micro-SD card.

The memory system 110 may be implemented as various types of storage devices. Examples of such storage devices may include, but are not limited to, volatile memory devices such as a dynamic random-access memory (DRAM) and a static RAM (SRAM), and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM or ReRAM) and a flash memory.

The memory system 110 may include a memory device 150 for storing data therein and a controller 130 for controlling the memory device 150.

The controller 130 and the memory device 150 may be integrated into a single semiconductor device. For example, the controller 130 and the memory device 150 may be integrated as one semiconductor device to constitute a solid-state drive (SSD). When the memory system 110 is used as an SSD, the operating speed of a host connected to the memory system 110 can be improved. In addition, the controller 130 and the memory device 150 may be integrated as one semiconductor device to constitute a memory card. For example, the controller 130 and the memory device 150 may constitute a memory card such as a personal computer memory card international association (PCMCIA) card, compact flash (CF) card, a smart media (SM) card, a memory stick, a multimedia card (MMC) including reduced size MMC (RS-MMC) and a micro-MMC, secure digital (SD) card including a mini-SD card, a micro-SD card and an SDHC card, or a universal flash storage (UFS) device.

Non-limiting application examples of the memory system 110 may include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device and may retain data stored therein even though power is not supplied. The memory device 150 may store data provided from a host through a write operation, and provide data stored therein to the host through a read operation. The memory device 150 may include a plurality of memory blocks 210, 220, 230 . . . 240 each of which may include a plurality of pages, and each of the pages may include a plurality of memory cells coupled to a word line. In an embodiment, the memory device 150 may be a flash memory. The flash memory may have a 3-dimensional (3D) stack structure.

An example structure of a 3D memory device 150 will be described in detail with reference to FIGS. 2 to 4.

Figure 2:
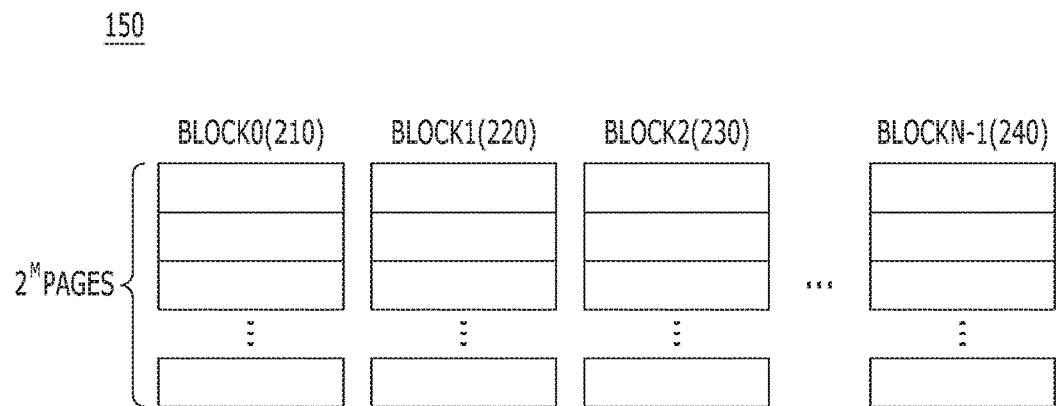
FIG. 2 is a schematic diagram illustrating a configuration of a memory device employed in the memory system of FIG. 1.
Figure 3:
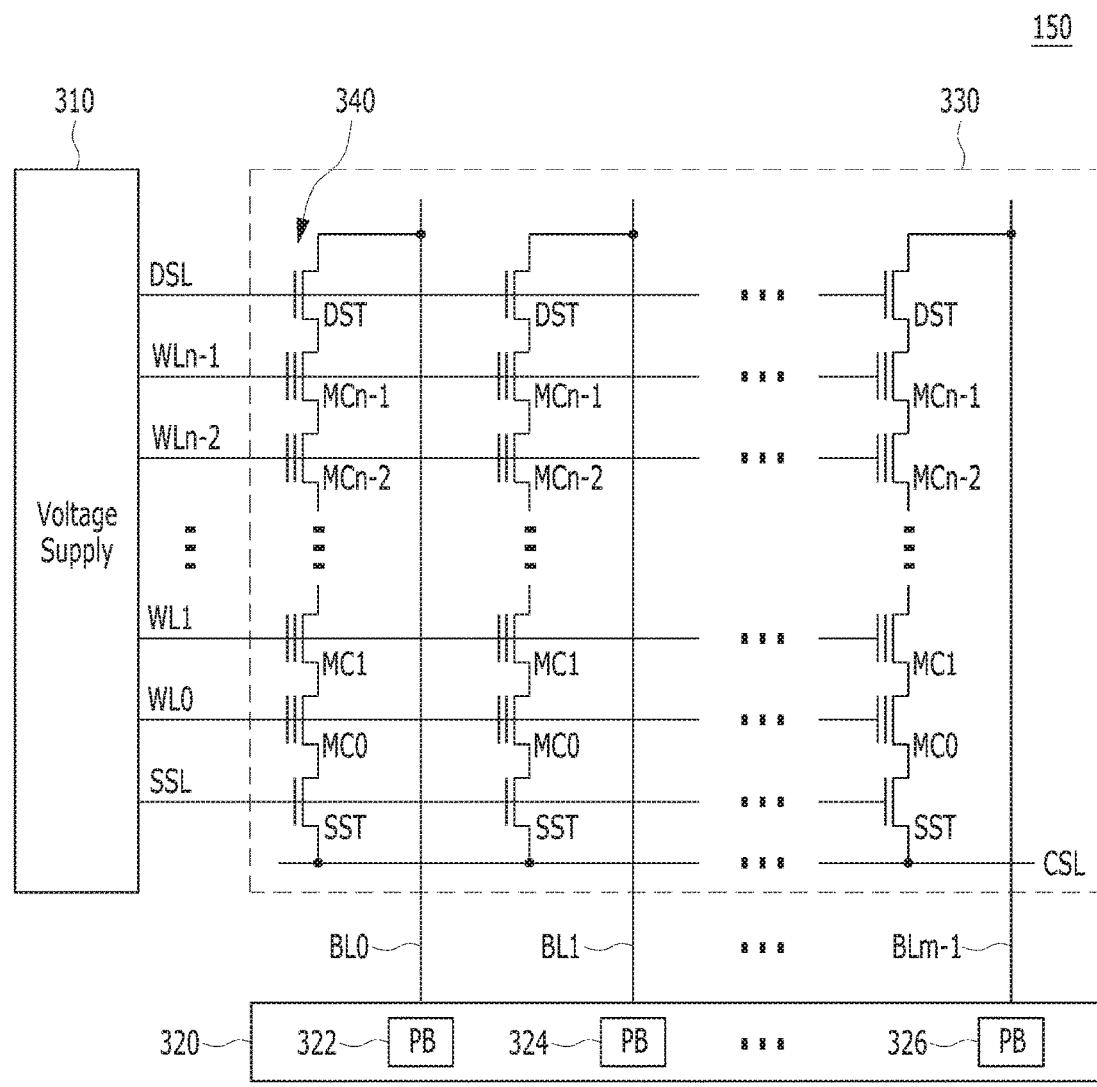
FIG. 3 is a circuit diagram illustrating a configuration of a memory cell array of a memory block in the memory device shown in FIG. 1.

FIG. 2 is a schematic diagram illustrating the memory device 150, and FIG. 3 is a circuit diagram illustrating a configuration of a memory cell array 330 of a memory block in the memory device 150.

Referring to FIG. 2, the memory device 150 may include a plurality of memory blocks BLOCK0 to BLOCKN−1, e.g., BLOCK0 (210), BLOCK1 (220), BLOCK2 (230), and to BLOCKN−1 (240). Each of the memory blocks 210, 220, 230 and 240 may include a plurality of pages, for example 2M pages, the number of which may vary according to circuit design. For example, in some applications, each of the memory blocks may include M pages. Each of the pages may include a plurality of memory cells that are coupled to a word line WL.

Furthermore, a plurality of memory blocks included in the memory device 150 may be implemented with any one of a single level cell (SLC) memory block and a multi-level cell (MLC) memory block capable of storing two or more bits in one memory cell, depending on the number of bits which can be stored in one memory cell. Some examples of MLC memory blocks are a double level cell memory block (also called a MLC memory block), a triple level cell (TLC) memory block, and a quadruple level cell (QLC) memory block.

In accordance with an embodiment of the present invention, the memory device 150 may be a non-volatile memory, such as a flash memory, e.g., a NAND flash memory. However, the memory device 150 may be realized as any one of a Phase Change Random-access Memory (PCRAM), a Resistive Random-access Memory (RRAM or ReRAM), a Ferroelectric Random-access Memory (FRAM), a Spin Transfer Torque Magnetic Random-access Memory (STT-RAM or STT-MRAM) and the like.

The memory blocks 210, 220, 230, . . . 240 may store the data transferred from a host through a program operation, and transfer data stored therein to the host through a read operation.

Referring to FIG. 3, a memory block 330, which may correspond to any of the plurality of memory blocks 210 to 240 included in the memory device 150 of the memory system 110, may include a plurality of cell strings 340 coupled to a plurality of corresponding bit lines BL0 to BLm−1. The cell string 340 of each column may include one or more drain select transistors DST and one or more source select transistors SST. Between the drain and source select transistors DST and SST, a plurality of memory cells or memory cell transistors MC0 to MCn−1 may be coupled in series. In an embodiment, each of the memory cells MC0 to MCn−1 may be implemented as an MLC capable of storing data information of a plurality of bits. Each of the cell strings 340 may be electrically coupled to a corresponding bit line among the plurality of bit lines BL0 to BLm−1. For example, as illustrated in FIG. 3, the first cell string is coupled to the first bit line BL0, and the last cell string is coupled to the last bit line BLm−1. For reference, in FIG. 3, 'DSL' denotes a drain select line, 'SSL' denotes a source select line, and 'CSL' denotes a common source line.

Although FIG. 3 illustrates NAND flash memory cells, the invention disclosure is not limited in this way. It is noted that the memory cells may be NOR flash memory cells, or hybrid flash memory cells including two or more types of memory cells combined therein. Also, it is noted that the memory device 150 may be a flash memory device including a conductive floating gate as a charge storage layer or a charge trap flash (CTF) memory device including an insulation layer as a charge storage layer.

The memory device 150 may further include a voltage supply which may provide word line voltages to the word lines according to an operation mode. The word line voltages may include, for example, a program voltage, a read voltage, and a pass voltage. The voltage generation operation of the voltage supply 310 may be controlled by a control circuit (not illustrated). Under the control of the control circuit, the voltage supply 310 may select one of the memory blocks (or sectors) of the memory cell array, select one of the word lines of the selected memory block, and provide the word line voltages to the selected word line and/or the unselected word lines, as may be needed.

The memory device 150 may include a read and write (read/write) circuit 320. The read/write circuit 320 may be controlled by the control circuit. During a verification/normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated), data to be stored into the memory cell array, and drive bit lines according to the received data. The read/write circuit 320 may include a plurality of page buffers 322 to 326 respectively corresponding to columns (or bit lines) or column pairs (or bit line pairs). Each of the page buffers 322 to 326 may include a plurality of latches (not illustrated).

The memory device 150 may be embodied as a two-dimensional (2D) or three-dimensional (3D) memory device. The memory device 150 may be embodied as a nonvolatile memory device having a 3D stack structure. For example, the memory device 150 may have a 3D structure including the plurality of memory blocks BLOCK0 to BLOCKN−1.

Each memory block (e.g. memory block 330) of the memory device 150 may include a plurality of NAND strings 340 arranged in a first direction and a second direction, each NAND string 340 extending in a third direction. The first and second directions may define a top plane of a semiconductor substrate. The third direction may be perpendicular to the plane defined by the first and second directions. Each of the NAND strings 340 may be coupled to a respective bit line BL, at least one drain selection line DSL, at least one source selection line SSL, a plurality of word lines WL, at least one dummy word line DWL (not shown), and a common source line CSL. Each of the NAND strings 340 may include a plurality of transistor structures.

Each memory block 330 of the memory device 150 may be coupled to a plurality of bit lines BL, a plurality of drain selection lines DSL, a plurality of source selection lines SSL, a plurality of word lines WL, a plurality of dummy word lines DWL, and a plurality of common source lines CSL, and each memory block 330 may include a plurality of NAND strings 340. Also, in each memory block 330, one bit line BL may be coupled to a plurality of NAND strings 340 to realize a plurality of transistors in one NAND string 340. A drain selection transistor DST of each NAND string 340 may be coupled to a corresponding bit line BL, and a source selection transistor SST of each NAND string 340 may be coupled to a common source line CSL. Memory cells MC may be provided between the drain selection transistor DST and the source selection transistor SST of each NAND string 340. In other words, a plurality of memory cells may be realized in each memory block 330 of the memory device 150.

Figure 4A:
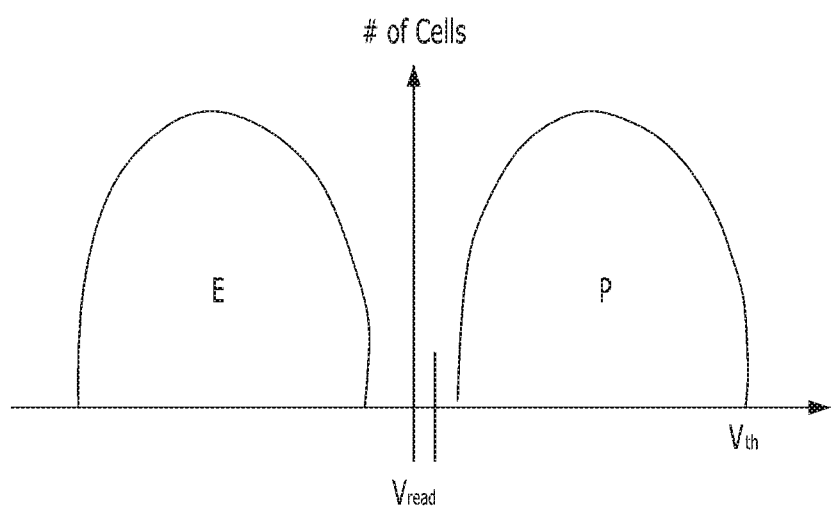
FIGS. 4A and 4B illustrate threshold voltage distributions of memory cells.
Figure 4B:
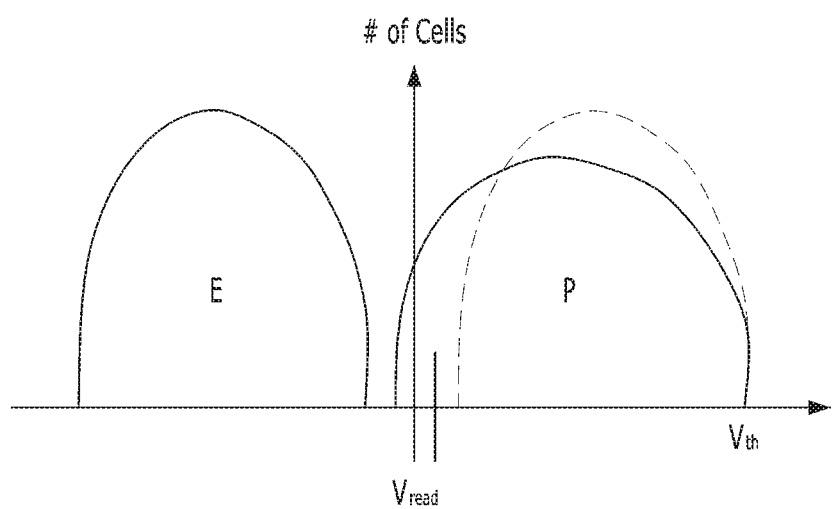

FIGS. 4A and 4B illustrate threshold voltage distributions of memory cells.

FIG. 4A illustrates threshold voltage distributions that single level memory cells may have. When a single level memory cell is programmed, the single level memory cell may have any one threshold voltage distribution of a program state P and an erase state E, depending on data to be programmed. When the voltage supply unit 310 applies a read voltage Vread to a word line coupled to the memory cell, the amount of current flowing through a bit line may be changed depending on the threshold voltage of the memory cell, such that the state of the memory cell is divided into the program state P and the erase state E.

Since the memory cell has an oxide layer formed of a dielectric material, an electric charge stored in a floating gate through the oxide layer may not easily escape during the program operation. However, when no voltage is applied to the corresponding memory cell for a long time, the electric charge may leak and may thus reduce the charge retention of the memory cell. In this case, the threshold voltage which has risen may fall.

FIG. 4B illustrates threshold voltage distributions that memory cells from which electric charges have leaked may have. Referring to FIG. 4B, some of memory cells which have had a threshold voltage corresponding to the program state P may have a lower threshold voltage than the read voltage Vread. When the read voltage Vread is applied to a word line coupled to such memory cells, the states of the corresponding memory cells may be distorted and read as the erase state E. Therefore, the controller 130 which will be described below may detect and correct an error of data read from the memory device 150.

However, when a read operation is performed on a memory area of the memory device 150, which has not been accessed for a long time, an error which cannot be corrected by the controller 130 may occur. Therefore, the controller 130 may perform a media scan operation as a background operation, in order to prevent an occurrence of uncorrectable error in the memory area which has not been accessed for a long time.

Referring back to FIG. 1, the controller 130 of the memory system 110 may control the memory device 150 in response to a request from the host.

In accordance with the illustrated embodiment, the controller may include a host interface (I/F) 132, a data validation component 134, a monitoring component 136, a media scanner 138, a period calculator 140, a media scan controller 142 and a memory I/F 144.

The monitoring component 136 includes all circuits, systems, software, firmware and devices necessary for their respective operations and functions.

The host I/F 132 may be configured to process a command and data of a host, and may communicate with the host through one or more of various interface protocols. Examples of interface protocols may include universal serial bus (USB), multi-media card (MMC), peripheral component interconnect-express (PCI-e or PCIe), small computer system interface (SCSI), serial-attached SCSI (SAS), serial advanced technology attachment (SATA), parallel advanced technology attachment (PATA), enhanced small disk interface (ESDI) and integrated drive electronics (IDE). The host I/F 132 for exchanging data with the host may be driven through firmware referred to as a host interface layer (HIL).

The data validation component 134 may include an ECC encoder and an ECC decoder. The ECC encoder may generate data having a parity bit added thereto by performing ECC encoding on data to be programmed to the memory device 150. The data having the parity bit added thereto may be stored in the memory device 150. The ECC decoder may detect and correct an error included in data read from the memory device 150.

According to a result of the error correction decoding process, the data validation component 134 may output a signal, for example, an error correction success/fail signal. When the number of error bits is more than a threshold value of correctable error bits, the data validation component 134 may not correct the error bits, and may output an error correction fail signal.

The data validation component 134 may perform error correction through a coded modulation such as Low Density Parity Check (LDPC) code, Bose-Chaudhri-Hocquenghem (BCH) code, turbo code, Reed-Solomon code, convolution code, Recursive Systematic Code (RSC), Trellis-Coded Modulation (TCM) and Block coded modulation (BCM). The data validation component 134 is not limited to any specific structure. The data validation component 134 may include all circuits, modules, systems or devices suitable for the error correction.

The memory I/F 144 may serve as a memory/storage interface for interfacing the controller 130 and the memory device 150 such that the controller 130 controls the memory device 150 in response to a request from the host. When the memory device 150 is a flash memory or specifically a NAND flash memory, the memory I/F 144 may generate a control signal for the memory device 150 and process data to be provided to the memory device 150 under the control of a processor (not shown). The memory I/F 144 may work as an interface (e.g., a NAND flash interface) for processing a command and data between the controller 130 and the memory device 150. For example, the memory I/F 144 may support data transfer between the controller 130 and the memory device 150. The memory I/F 144 may be driven through firmware. The firmware may be a flash interface layer (FIL).

The media scanner 138 may perform a media scan operation. The media scan operation may include an operation of periodically reading data of a certain area of the memory device 150, an operation of detecting an error of the data read from the memory device 150 and generating corrected data of the read data, and an operation of storing the corrected data in another area of the memory device 150 according to whether the number of bits included in the detected error exceeds a predetermined threshold value. A media scan operation will be described in detail with reference to FIG. 5.

The controller 130 may also include a processor and a memory which are not shown.

The processor may be realized as a microprocessor or a central processing unit (CPU). The processor may control the overall operations of the memory system 110. The processor may perform a foreground operation as the command operation corresponding to the command received from the host. For example, the processor may control a program operation or read operation of a memory device 150, in response to a write request or a read request. The processor may drive firmware to control the overall operations of the memory system 110. The firmware may be the flash translation layer (FTL). Also, the processor may perform a background operation.

The memory may serve as a working memory of the memory system 110 and the controller 130, and store data for driving the memory system 110. For example, the memory may temporarily store data read from the memory device 150 and provide the stored data to the host, or temporarily store data received from the host and provide the stored data to the memory device 150. The memory may include a program memory, a data memory, a write buffer/cache, a read buffer/cache, a data buffer/cache, a map buffer/cache and the like, in order to store the data for driving the memory system 110.

The memory may be implemented as a volatile memory. For example, the memory may be implemented as static random-access memory (SRAM) or dynamic random-access memory (DRAM). The memory may be disposed within or out of the controller 130.

In an implementation of the controller 130, the host I/F 132, the data validation component 134, the monitoring component 136, the media scanner 138, the period calculator 140, the media scan controller 142 and the memory I/F 144 may be loaded into the memory (not shown) of the controller 130, and driven by the processor (not shown) within the controller 130.

FIG. 1 exemplifies the memory disposed within the controller 130. In an embodiment, the memory may be implemented as an external volatile memory having a memory interface transferring data between the memory and the controller 130.

Figure 5:
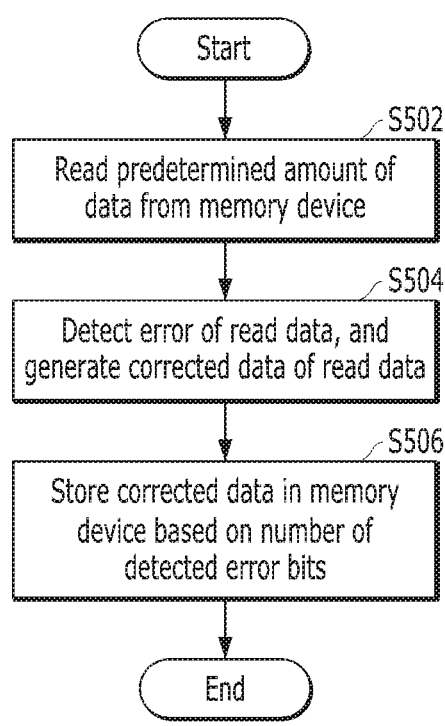
FIG. 5 is a flowchart of a background media scan operation of a memory system.

Referring now to FIG. 5, a flowchart of a media scan operation of the memory system 110 is provided.

In step S502, the media scanner 138 may read a predetermined amount of data from the memory device 150 in a predetermined cycle.

For example, the media scanner 138 may divide the memory area of the memory device 150 into 128 chunks according to addresses, and sequentially read the 128 chunks one by one in a cycle of six hours.

The media scanner 138 may provide the memory device 150 with a read command and an address corresponding to a chunk of the memory area of the memory device 150 to be read through the memory I/F 144. The memory device 150 may read the data from the memory area chunk corresponding to the received address. The memory device 150 may further send the read data into the memory I/F 144. In step S504, the data validation component 134 may detect an error of the read data, and generate corrected data by correcting the error of the read data.

In step S506, the media scanner 138 may store the corrected data in the memory device 150 based on the number of bits included in the detected error.

For example, when the number of bits included in the detected error exceeds a media scan threshold value, the media scanner 138 may store the corrected data in another location of the memory area, instead of the location of the memory area in which the read data was previously stored when it was read.

On the other hand, when the number of bits included in the detected error is less than or equal to a media scan threshold value, the media scanner 138 may not store the corrected data.

The media scan threshold value may be previously decided based on the maximum number of error bits which can be corrected from the read data by the data validation component 134. In this specification, the maximum number of correctable error bits may be defined as the error correction threshold value. For example, the media scan threshold value may be decided as 90% of the error correction threshold value.

When the media scanner 138 sequentially reads the 128 chunks one by one in the cycle of six hours, all of the memory areas of the memory device 150 may be accessed in a cycle of at least about one month, and errors may be corrected. The cycle of six hours is merely an example and the invention is not limited only to such cycle. The duration of the cycle may be varied without departing from the scope of the invention.

All memory areas of the memory device 150 may be periodically read by the media scan operation, while the memory system 110 is powered on. Furthermore, before data are lost due to the charge leakage described with reference to FIGS. 4A and 4B, an error of the data may be corrected, and the corrected data may be stored in another area if needed. Therefore, the reliability of the memory system 110 may be improved.

However, when the memory system 110 is powered off for a long time, the background media scan operation is not performed. Thus, the data are likely to be lost due to charge leakage in all of the memory areas of the memory device 150.

Therefore, in accordance with an embodiment, the controller may adjust the cycle of the media scan operation according to a power down time and a data loss, thereby adjusting the time required for performing the media scan operation on the entire areas of the memory device 150.

Referring back to FIG. 1, the monitoring component 136 may monitor whether power is supplied to the memory system 110. When power is supplied to the memory system 110, the monitoring component 136 may decide the start time of the power supply. When the power supplied to the memory system 110 is cut off, the monitoring component 136 may decide the cut-off time of the power supply, and store the power supply cut-off time in the memory system 110.

In an implementation, the monitoring component 136 may acquire the absolute time from the host, and decide the power supply start time and the power supply cut-off time. In an implementation, the monitoring component 136 may store the power supply cut-off time in the memory device 150 or a nonvolatile memory device included in the monitoring component 136.

When power is supplied to the memory system 110, the period calculator 140 may calculate a power-off period according to the last cut-off time and the last start time for the current time during which the memory system 110 is being driven.

The media scan controller 142 may control the cycle of the media scan operation according to a predetermined condition. The predetermined condition may include the power-off period and the error bit threshold value which will be described below.

Figure 6:
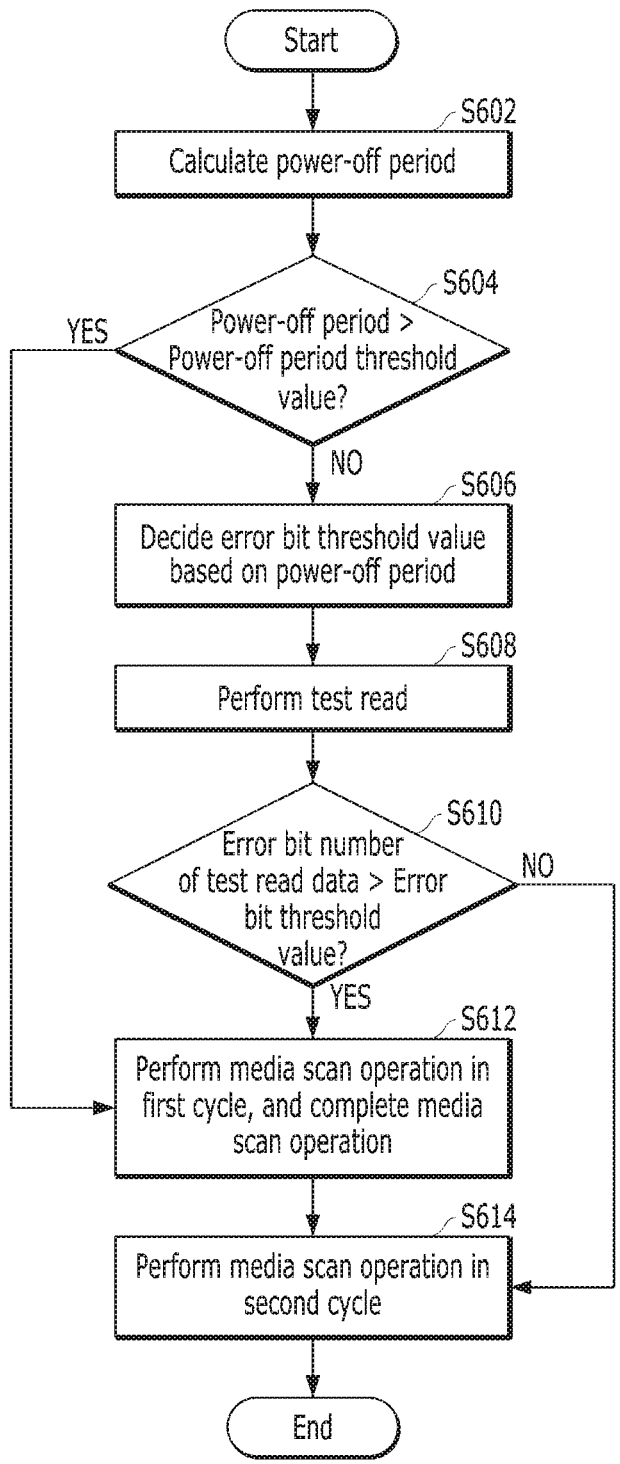
FIG. 6 is a flowchart of an operation of the memory system in accordance with an embodiment of the present invention.

FIG. 6 is a flowchart of an operation of the memory system in accordance with an embodiment of the present invention.

The memory system 110 may be designed to guarantee the reliability of data until a predetermined power-off period. For example, the JEDEC requirements include a one-year power-off period as a reliability guarantee period for a solid-state drive (SSD) for general users.

When power is supplied to the memory system 110, the period calculator 140 may calculate the power-off period in step S602. For example, the period calculator 140 may calculate the power-off period based on the last cut-off time of power supply and the last start time.

The period calculator 140 may acquire the last start time from the monitoring component 136. The period calculator 140 may acquire the last cut-off time which has been stored in the memory system 110 previously. The period calculator 140 may calculate a difference between the last start time and the last cut-off time as the power-off period. The period calculator 140 may then send the calculated power-off period to the media scan controller 142.

In step S604, the media scan controller 142 may determine whether the power-off period exceeds a power-off period threshold value. In an embodiment, the power-off period threshold value may indicate the reliability guarantee period.

When the power-off period exceeds the power-off period threshold value ("YES" in step S604), the controller 130 may perform step S612 which will be described below.

When the power-off period does not exceed the power-off period threshold value ("NO" in step S604), the media scan controller may decide an error bit threshold value based on the power-off period in step S606. The error bit threshold value may serve as a threshold value for determining whether a data loss of the memory device 150 is larger than a predicted data loss by the power-off period. A method for deciding the error bit threshold value in accordance with an embodiment will be described with reference to FIG. 7.

Figure 7:
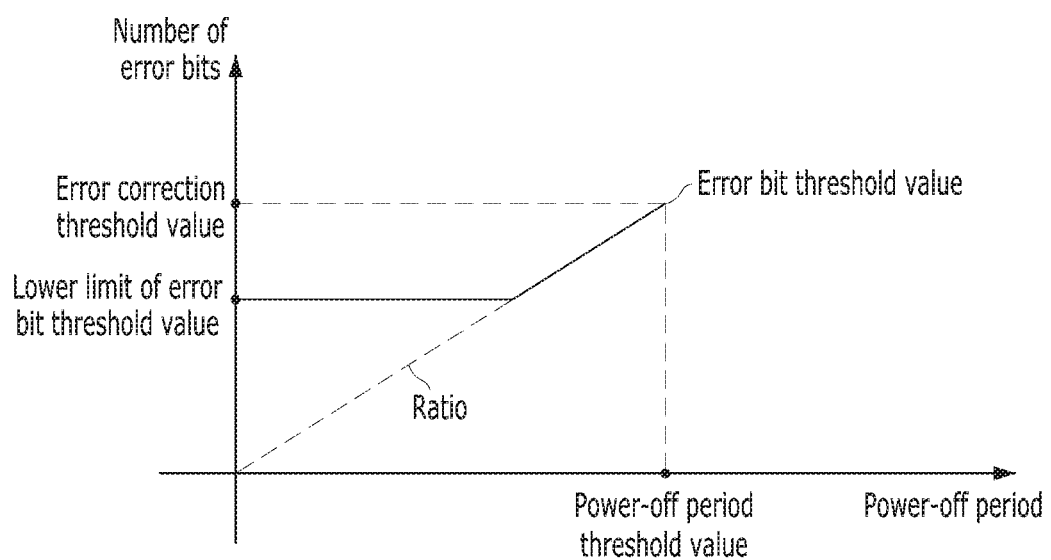
FIG. 7 is a graph describing an error bit threshold value in accordance with an embodiment of the present invention.

FIG. 7 is a graph for describing the error bit threshold value in accordance with the present embodiment.

In the graph of FIG. 7, the horizontal axis indicates the power-off period, and the vertical axis indicates the number of error bits. In the graph of FIG. 7, a solid line may indicate the error bit threshold value in accordance with the present embodiment. The power-off period threshold value may be set on the horizontal axis of the graph, and the error correction threshold value and the lower limit of the error bit threshold value may be set on the vertical axis of the graph.

When the power-off period of the memory system 110 reaches the power-off period threshold value, it may be expected that the number of error bits contained in the data stored in the memory device 150 will reach the error correction threshold value. As the power-off period of the memory system 110 increases, the number of error bits contained in the data stored in the memory device 150 may increase. That is, the power-off time may be proportional to the number of error bits contained in the data stored in the memory device 150.

The graph of FIG. 7 illustrates the ratio of the reliability guarantee period to the maximum number of error bits (hereinafter referred to as the reliability ratio). Based on the reliability ratio and the power-off period, the number of error bits contained in the data stored in the memory device 150 may be predicted.

In accordance with an embodiment, the media scan controller may decide the predicted number of error bits as the error bit threshold value.

In accordance with an embodiment, the lower limit of the error bit threshold value may be decided in advance. The lower limit of the error bit threshold value may be decided based on the error correction threshold value. The lower limit of the error bit threshold value may be decided as 70% of the error correction threshold value, for example, in proportion to the error correction threshold value. Referring to FIG. 7, when the predicted number of error bits is less than the lower limit of the error bit threshold value, the lower limit of the error bit threshold value may be decided as the error bit threshold value.

That is, in accordance with an embodiment, the media scan controller 142 may decide the larger value between the predicted number of error bits and the lower limit of the error bit threshold value as the error bit threshold value.

Referring back to FIG. 6, the media scan controller 142 may control a test read operation on some of the data stored in the memory device 150 in step S608.

Specifically, the media scan controller 142 may control the memory device 150 to read recently programmed data. The address of the recently programmed data may be programmed to the memory device 150 in advance before the power supply to the memory system 110 is cut off. The data validation component 134 may detect an error of the test read data which are read from the memory device 150, and generate corrected test read data.

In step S610, the media scan controller 142 may determine whether the number of error bits contained in the test read data exceeds the error bit threshold value. That is, even when the power-off time does not exceed the reliability guarantee period, the media scan controller 142 may determine whether a data loss of the memory device 150 is larger than a data loss which is predicted according to the reliability ratio and the power-off period.

When the number of error bits contained in the test read data exceeds the error bit threshold value ("YES" in step S610), the controller 130 may perform step S612.

When the number of error bits contained in the test read data does not exceed the error bit threshold value ("NO" in step S610), the controller 130 may perform step S614.

In step S612, the media scanner 138 may perform the media scan operation in a first cycle, and thus complete the media scan operation on all of the data.

Specifically, the media scan controller 142 may decide the cycle of the media scan operation as the first cycle. The media scanner 138 may divide the data stored in the memory device 150 into a plurality of chunks. The media scanner 138 may sequentially read the plurality of chunks one by one in the first cycle, thereby completing the media scan operation on all of the data stored in the memory device 150. When the media scan operation on all of the data stored in the memory device 150 is completed, the controller may perform step S614.

In an implementation, steps S602 to S612 may be performed during a booting operation of the memory system 110. When the booting operation of the memory system 110 is completed, the controller 130 may perform step S614.

The first cycle may indicate the time required for performing the media scan operation for one chunk. When the media scan controller 142 decides the cycle of the media scan operation as the first cycle, the media scanner 138 may perform the media scan operation for the next chunk immediately after completing the media scan operation for one chunk. That is, when the memory device 150 has a large data loss, the media scan controller 142 may decide the cycle of the media scan operation such that the media scanner 138 performs the media scan operation on all of the data stored in the memory device 150 within a short time.

In step S614, the media scan controller 142 may decide the cycle of the media scan operation as a second cycle. The media scanner 138 may divide the data stored in the memory device 150 into a plurality of chunks. The media scanner 138 may sequentially read the plurality of chunks one by one in the second cycle as a background operation, thereby maintaining the reliability of the data stored in the memory device 150.

The first cycle may be shorter than the second cycle.

The second cycle may be set to a cycle sufficient enough to correct an error of the memory device 150 when charge leakage of the memory device 150 is not so large, like the cycle of six hours in the above-described example.

In accordance with the present embodiment, when the power-off period exceeds the reliability guarantee period and when an actual data loss is larger than a predicted data loss of the memory device even though the power-off period does not exceed the reliability guarantee period, the media scanner 138 may perform the media scan operation on all of the memory areas of the memory device 150 within a short time, after power is supplied to the memory system 110. In accordance with the present embodiment, the media scan operation may be performed before data are lost to such an extent that an error cannot be corrected by the data validation component due to a power-off, which makes it possible to improve the reliability of the memory system 110.

Hereafter, referring to FIGS. 8 to 16, data processing systems and electronic devices to which the memory system 110 is applied will be described in more detail, the memory system 110 having been described with reference to FIGS. 1 to 7 in accordance with the present embodiment and including the memory device 150 and the controller 130.

Figure 8:
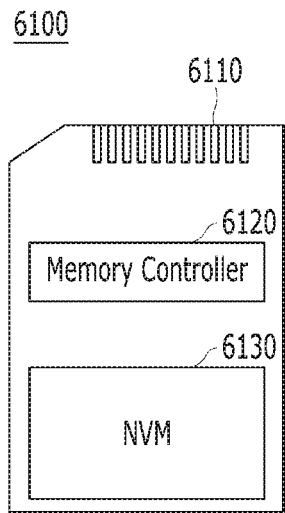
FIGS. 8 to 16 are diagrams schematically illustrating application examples of a data processing system, in accordance with various embodiments of the present invention.

FIG. 8 is a diagram schematically illustrating a data processing system including the memory system in accordance with an embodiment of the present invention. FIG. 8 schematically illustrates a memory card system 6100 to which the memory system in accordance with an embodiment is applied.

Referring to FIG. 8, the memory card system 6100 may include a memory controller 6120, a memory device 6130 and a connector 6110.

More specifically, the memory controller 6120 may be connected to the memory device 6130 embodied by a nonvolatile memory (NVM), and configured to access the memory device 6130. For example, the memory controller 6120 may be configured to control read, write, erase and background operations of the memory device 6130. The memory controller 6120 may be configured to provide an interface between the memory device 6130 and a host (not shown), and drive firmware for controlling the memory device 6130. That is, the memory controller 6120 may correspond to the controller 130 of the memory system 110 described with reference to FIG. 1, and the memory device 6130 may correspond to the memory device 150 of the memory system 110 described with reference to FIG. 1.

Thus, as described above with reference to FIG. 1, the memory controller 6120 may include a random-access memory (RAM), a processor, a host interface, a memory interface and an error correction component.

The memory controller 6120 may communicate with an external device, for example a host, through the connector 6110. For example, as described with reference to FIG. 1, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), wireless fidelity (Wi-Fi or WiFi) and Bluetooth. Thus, the memory system and the data processing system in accordance with an embodiment may be applied to wired and/or wireless electronic devices, particularly mobile electronic devices.

The memory device 6130 may be implemented by a nonvolatile memory. For example, the memory device 6130 may be implemented by any of various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM).

The memory controller 6120 and the memory device 6130 may be integrated into a single semiconductor device. For example, the memory controller 6120 and the memory device 6130 may be integrated to form a solid-state driver (SSD). Also, the memory controller 6120 and the memory device 6130 may form a memory card such as a PC card (e.g., Personal Computer Memory Card International Association (PCMCIA)), a compact flash (CF) card, a smart media card (e.g., SM and SMC), a memory stick, a multimedia card (e.g., MMC, RS-MMC, MMCmicro and eMMC), an secured digital (SD) card (e.g., miniSD card, microSD card and SDHC card) and a universal flash storage (UFS).

Figure 9:
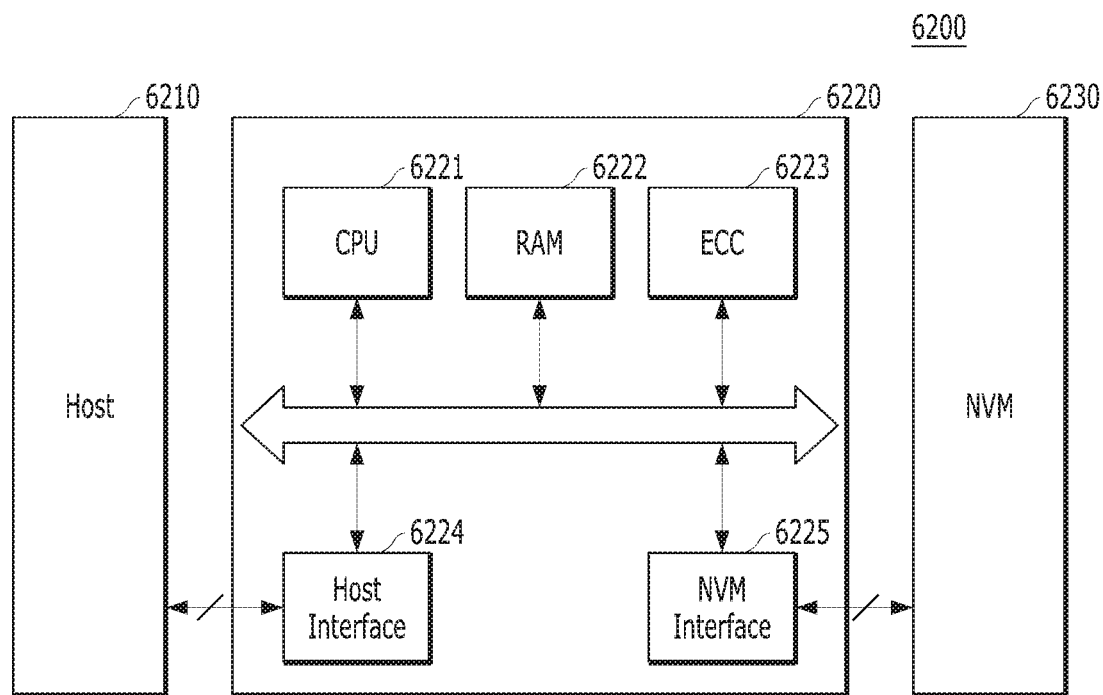

FIG. 9 is a diagram schematically illustrating another example of a data processing system 6200 including the memory system in accordance with an embodiment of the present invention.

Referring to FIG. 9, the data processing system 6200 may include a memory device 6230 having one or more nonvolatile memories (NVMs) and a memory controller 6220 for controlling the memory device 6230. The data processing system 6200 may serve as a storage medium such as a memory card (CF card, SD card or the like) or USB device, as described with reference to FIG. 1. The memory device 6230 may correspond to the memory device 150 in the memory system 110 illustrated in FIG. 1, and the memory controller 6220 may correspond to the controller 130 in the memory system 110 illustrated in FIG. 1.

The memory controller 6220 may control a read, write, or erase operation on the memory device 6230 in response to a request of the host 6210, and the memory controller 6220 may include one or more central processing units (CPUs) 6221, a buffer memory such as a random-access memory (RAM) 6222, an error correction code (ECC) circuit 6223, a host interface 6224 and a memory interface such as an NVM interface 6225.

The CPU 6221 may control overall operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the memory device 6230 to operate at high speed.

The ECC circuit 6223 may include the data validation component 134 of the controller 130 of FIG. 1. As described with reference to FIG. 1, the ECC circuit 6223 may generate an error correction code (ECC) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. The ECC circuit 6223 may correct an error using the parity bit. For example, as described with reference to FIG. 1, the ECC circuit 6223 may correct an error using Low Density Parity Check (LDPC) code, Bose-Chaudhri-Hocquenghem (BCH) code, turbo code, Reed-Solomon code, convolution code, Recursive Systematic Code (RSC) or coded modulation such as Trellis-Coded Modulation (TCM) or Block coded modulation (BCM).

The memory controller 6220 may transmit and/or receive data to and/or from the host 6210 through the host interface 6224, and transmit/receive data to/from the memory device 6230 through the NVM interface 6225. The host interface 6224 may be connected to the host 6210 through a parallel advanced technology attachment (PATA) bus, serial advanced technology attachment (SATA) bus, small computer system interface (SCSI), universal serial bus (USB), peripheral component interconnect-express (PCIe) or NAND interface. The memory controller 6220 may have a wireless communication function with a mobile communication protocol such as wireless fidelity (WiFi) or Long Term Evolution (LTE). The memory controller may be connected to an external device, for example, the host or another external device, and then transmit and/or receive data to and/or from the external device. In particular, as the memory controller 6220 is configured to communicate with the external device through one or more of various communication protocols, the memory system and the data processing system in accordance with an embodiment may be applied to wired and/or wireless electronic devices, particularly a mobile electronic device. The controller 6220 may further include the media scanner 138, the monitoring component 136, the period calculator 140 and the media scan controller 142 of FIG. 1. The CPU 6221 of the controller 6220 may correspond to the processor discussed with reference to FIG. 1. Also, it is noted that the host interface 6224 and the NVM interface of the controller 6220 may correspond to the host interface 132 and the memory device interface 144 of the controller 130 of FIG. 1.

Figure 10:
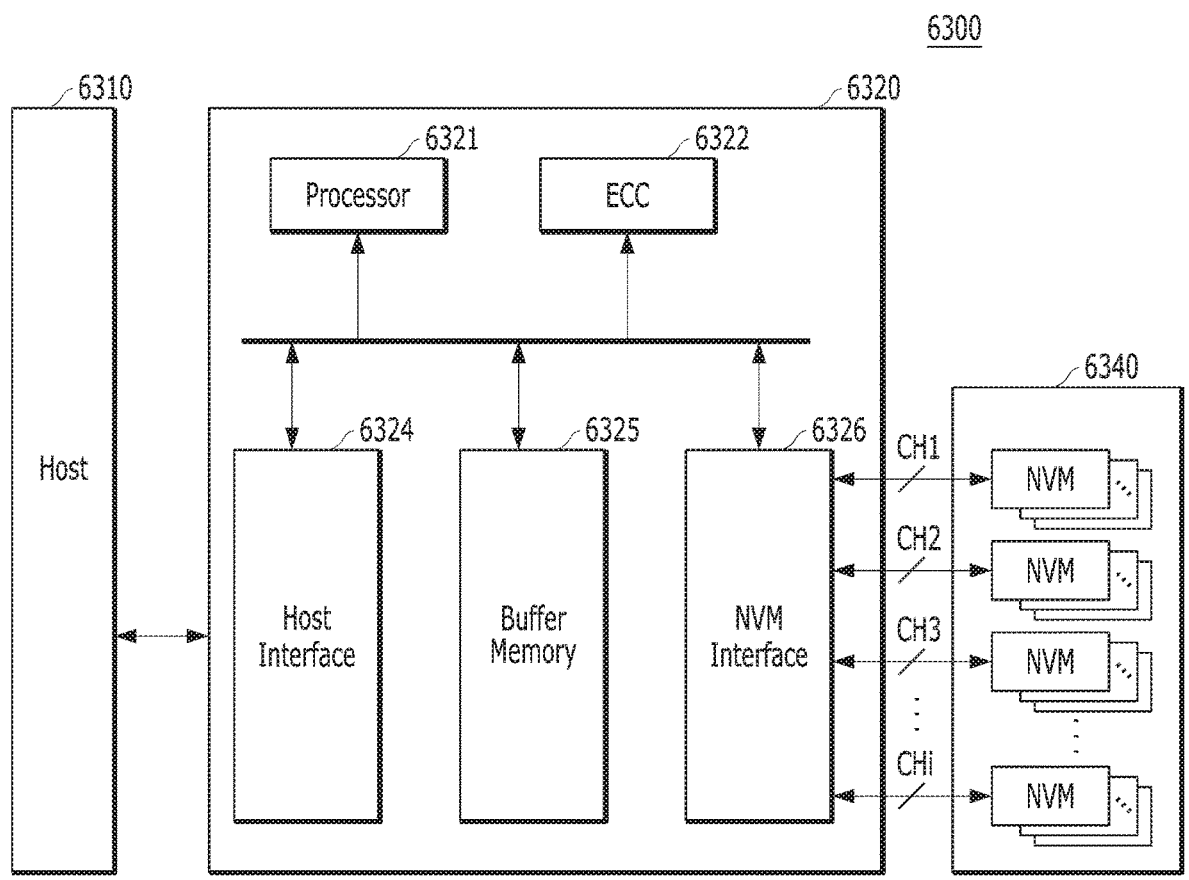

FIG. 10 is a diagram schematically illustrating another example of a data processing system including the memory system in accordance with an embodiment of the present invention. FIG. 10 schematically illustrates a solid-state drive (SSD) 6300 including a memory system according to an embodiment of the present invention.

Referring to FIG. 10, the SSD 6300 may include a controller and a memory device 6340. The memory device 6340 may include a plurality of nonvolatile memories (NVMs). The controller may correspond to the controller 130 in the memory system 110 of FIG. 1, and the memory device 6340 may correspond to the memory device 150 in the memory system of FIG. 1.

The controller 6320 may be connected to the memory device through a plurality of channels CH1 to CHi. The controller 6320 may include one or more processors 6321, an error correction code (ECC) circuit 6322, a host interface 6324, a buffer memory 6325 and a memory interface, for example, a nonvolatile memory interface 6326.

The buffer memory 6325 may temporarily store data provided from the host 6310 or data provided from the plurality of nonvolatile memories NVM included in the memory device 6340, or temporarily store meta data of the plurality of the nonvolatile memories NVM, for example, map data including a mapping table. The plurality of the nonvolatile memories NVM may be flash memories. The buffer memory 6325 may be implemented as a volatile memory such as a dynamic random-access memory (DRAM), a synchronous DRAM (SDRAM), a double data rate (DDR) SDRAM, a low power DDR (LPDDR) SDRAM and a graphics RAM (GRAM) or a nonvolatile memory such as a ferroelectric RAM (FRAM), a resistive RAM (RRAM or ReRAM), a spin-transfer torque magnetic RAM (STT-MRAM) and a phase-change RAM (PRAM). In the illustrated embodiment of FIG. 10 the buffer memory 6325 exists inside the controller 6320. However, in a variation of this embodiment, the buffer memory 6325 may exist outside of the controller 6320.

The ECC circuit 6322 corresponds to the data validation component 134 of FIG. 1. The ECC circuit 6322 may calculate an error correction code (ECC) value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels. The host interface 6324 may correspond with the host interface I/F 132 of FIG. 1.

Furthermore, a plurality of SSDs 6300 to which the memory system 110 of FIG. 1 is applied may be provided to embody a data processing system, for example, a redundant array of independent disks (RAID) system. The RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310. The controller 6320 may further include the media scanner 138, the monitoring component 136, the period calculator and the media scan controller 142 of FIG. 1. The CPU 6321 of the controller 6320 may correspond to the processor discussed with reference to FIG. 1. Also, it is noted that the host interface 6324 and the NVM interface 6326 of the controller 6320 may correspond to the host interface 132 and the memory device interface 144 of the controller 130 of FIG. 1.

Figure 11:
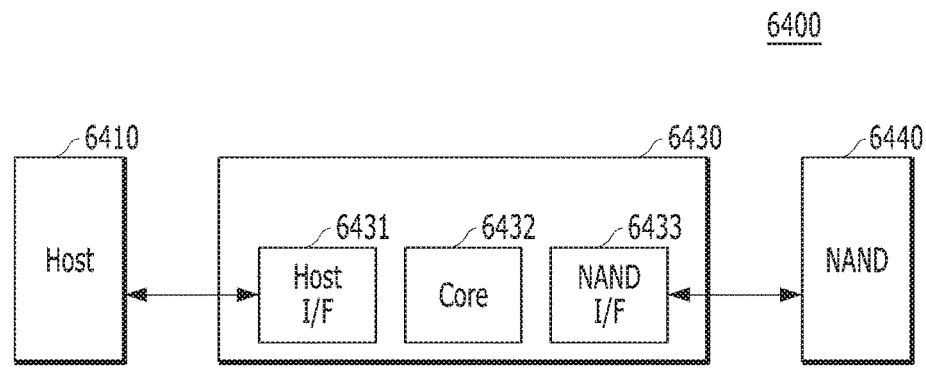

FIG. 11 is a diagram schematically illustrating another example of a data processing system including the memory system in accordance with an embodiment of the present invention. FIG. 11 schematically illustrates an embedded Multi-Media Card (eMMC) 6400 including a memory system according to an embodiment of the present invention.

Referring to FIG. 11, the eMMC 6400 may include a controller and a memory device 6440. The memory device may be one or more NAND flash memories. The controller 6430 may correspond to the controller 130 in the memory system 110 of FIG. 1, and the memory device 6440 may correspond to the memory device 150 in the memory system 110 of FIG. 1.

More specifically, the controller 6430 may be connected to the memory device 6440 through a plurality of channels. The controller may include one or more cores 6432, a host interface (I/F) 6431 and a memory interface, for example, a NAND interface (I/F) 6433.

The core 6432 may control the overall operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, Ultra High Speed (UHS)-I and UHS-II interface.

Each of the memory controller 6120, the memory controller 6220, the controller 6320 and the controller 6430, which have been described with reference to FIGS. 8 to 11, may include the media scan controller 142 and the media scanner 138 which have been described with reference to FIG. 1. When an actual data loss is larger than a predicted data loss of the memory device 6130, the memory device 6230, the memory device 6340 and the memory device 6440 even though the power-off periods of the memory card system 6100, the data processing system 6200, the SSD 6300 and the eMMC 6400 fall within the reliability guarantee period, the media scan operation may be performed on all of the memory areas of the respective memory devices, which makes it possible to improve the reliability of the data processing system. Each of the memory controller 6120, the memory controller 6220, the controller 6320 and the controller 6430, which have been described with reference to FIGS. 8 to 11, may include the monitoring component 136, the period calculator 140 and the media scan controller 138 which have been described with reference to FIG. 1.

FIGS. 12 to 15 are diagrams schematically illustrating other examples of a data processing system including the memory system in accordance with one or more embodiments of the present invention. FIGS. 12 to 15 schematically illustrate universal flash storage (UFS) systems including a memory system according to an embodiment of the present invention. The memory systems in accordance with the various embodiments described with reference to FIGS. 1 to 11 may be applied to the UFS systems described with reference to FIGS. 12 to 15.

Referring to FIGS. 12 to 15, the UFS systems 6500, 6600, and 6800 may include hosts 6510, 6610, 6710 and 6810, UFS devices 6520, 6620, 6720 and 6820 and UFS cards 6530, 6630, 6730 and 6830, respectively. The hosts 6510, 6610, 6710 and 6810 may serve as application processors of wired and/or wireless electronic devices, particularly mobile electronic devices, the UFS devices 6520, 6620, 6720 and 6820 may serve as embedded UFS devices. The UFS cards 6530, 6630, 6730 and 6830 may serve as external embedded UFS devices or removable UFS cards.

The hosts 6510, 6610, 6710 and 6810, the UFS devices 6520, 6620, 6720 and 6820 and the UFS cards 6530, 6630, 6730 and 6830 in the respective UFS systems 6500, 6600, 6700 and 6800 may communicate with external devices, for example, wired and/or wireless electronic devices, particularly mobile electronic devices through UFS protocols. The UFS devices 6520, 6620, 6720 and 6820 and the UFS cards 6530, 6630, 6730 and 6830 may be implemented as the memory system 110 illustrated in FIG. 1. For example, in the UFS systems 6500, 6600, 6700 and 6800, the UFS devices 6520, 6620, 6720 and 6820 may be embodied in the form of the data processing system 6200, the SSD 6300 or the eMMC 6400 described with reference to FIGS. 9 to 11, and the UFS cards 6530, 6630, 6730 and 6830 may be embodied in the form of the memory card system described with reference to FIG. 8.

Furthermore, in the UFS systems 6500, 6600, 6700 and 6800, the hosts 6510, 6610, 6710 and 6810, the UFS devices 6520, 6620, and 6820 and the UFS cards 6530, 6630, 6730 and 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720 and 6820 and the UFS cards 6530, 6630, 6730 and 6830 may communicate with each other through various protocols other than the UFS protocol, for example, universal storage bus (USB) Flash Drives (UFDs), multi-media card (MMC), secure digital (SD), mini-SD, and micro-SD.

Figure 12:
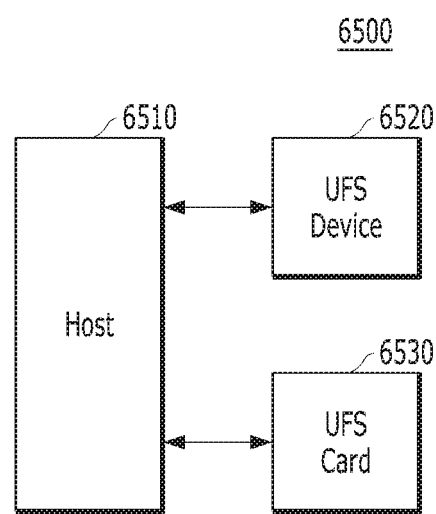

In the UFS system 6500 illustrated in FIG. 12, each of the host 6510, the UFS device 6520 and the UFS card 6530 may include UniPro. The host 6510 may perform a switching operation in order to communicate with the UFS device 6520 and the UFS card 6530. In particular, the host 6510 may communicate with the UFS device 6520 or the UFS card 6530 through link layer switching, for example, L3 switching at the UniPro. The UFS device 6520 and the UFS card 6530 may communicate with each other through link layer switching at the UniPro of the host 6510. In an embodiment, the configuration in which one UFS device 6520 and one UFS card 6530 are connected to the host 6510 has been exemplified for convenience of description. However, a plurality of UFS devices and UFS cards may be connected in parallel or in the form of a star to the host 6510, and a plurality of UFS cards may be connected in parallel or in the form of a star to the UFS device 6520, or connected in series or in the form of a chain to the UFS device 6520.

Figure 13:
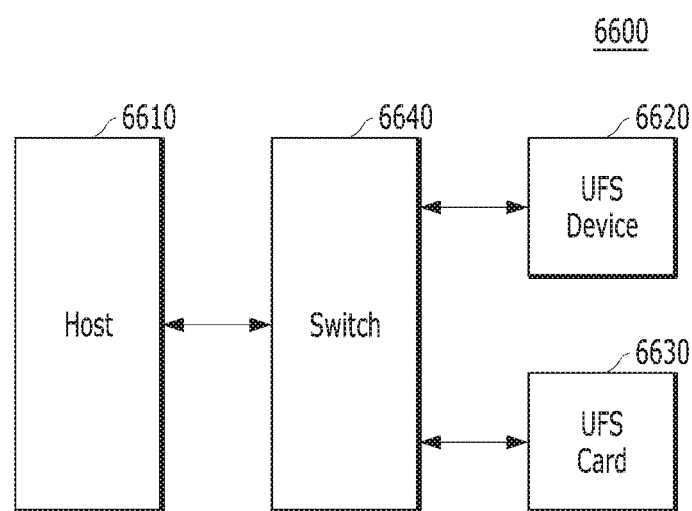

In the UFS system 6600 illustrated in FIG. 13, each of the host 6610, the UFS device 6620 and the UFS card 6630 may include UniPro, and the host 6610 may communicate with the UFS device or the UFS card 6630 through a switch 6640 performing a switching operation, for example, through the switch 6640 which performs link layer switching at the UniPro, for example, L3 switching. The UFS device 6620 and the UFS card 6630 may communicate with each other through link layer switching of the switch 6640 at UniPro. In an embodiment, the configuration in which one UFS device 6620 and one UFS card 6630 are connected to the switch 6640 has been exemplified for convenience of description. However, a plurality of UFS devices and UFS cards may be connected in parallel or in the form of a star to the switch 6640, and a plurality of UFS cards may be connected in series or in the form of a chain to the UFS device 6620.

Figure 14:
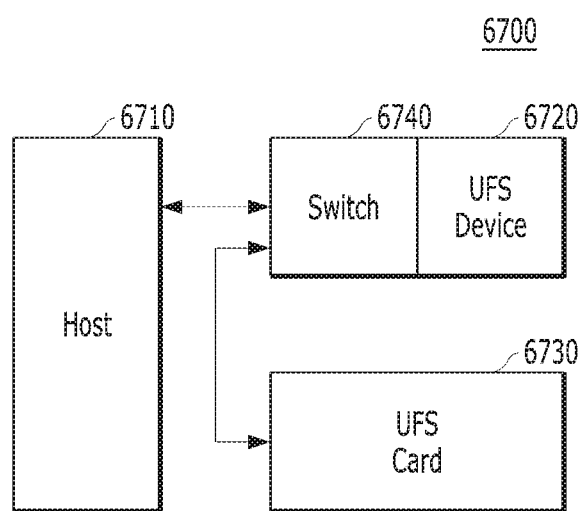

In the UFS system 6700 illustrated in FIG. 14, each of the host 6710, the UFS device 6720 and the UFS card 6730 may include UniPro. The host 6710 may communicate with the UFS device 6720 or the UFS card 6730 through a switch 6740 performing a switching operation, for example, through the switch 6740 which performs link layer switching at the UniPro, for example, L3 switching. The UFS device 6720 and the UFS card 6730 may communicate with each other through link layer switching of the switch 6740 at the UniPro, and the switch 6740 may be integrated as one module with the UFS device 6720 inside or outside the UFS device 6720. In an embodiment, the configuration in which one UFS device 6720 and one UFS card 6730 are connected to the switch 6740 has been exemplified for convenience of description. However, a plurality of modules each including the switch 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

Figure 15:
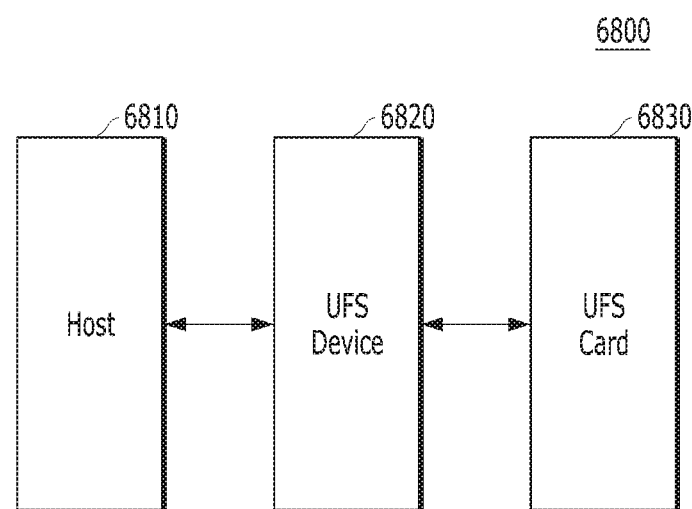

In the UFS system 6800 illustrated in FIG. 15, each of the host 6810, the UFS device 6820 and the UFS card 6830 may include M-PHY and UniPro. The UFS device 6820 may perform a switching operation in order to communicate with the host 6810 and the UFS card 6830. In particular, the UFS device 6820 may communicate with the host or the UFS card 6830 through a switching operation between the M-PHY and UniPro module for communication with the host 6810 and the M-PHY and UniPro module for communication with the UFS card 6830, for example, through a target Identifier (ID) switching operation. The host 6810 and the UFS card 6830 may communicate with each other through target ID switching between the M-PHY and UniPro modules of the UFS device 6820. In an embodiment, the configuration in which one UFS device 6820 is connected to the host and one UFS card 6830 is connected to the UFS device 6820 has been exemplified for convenience of description. However, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 16:
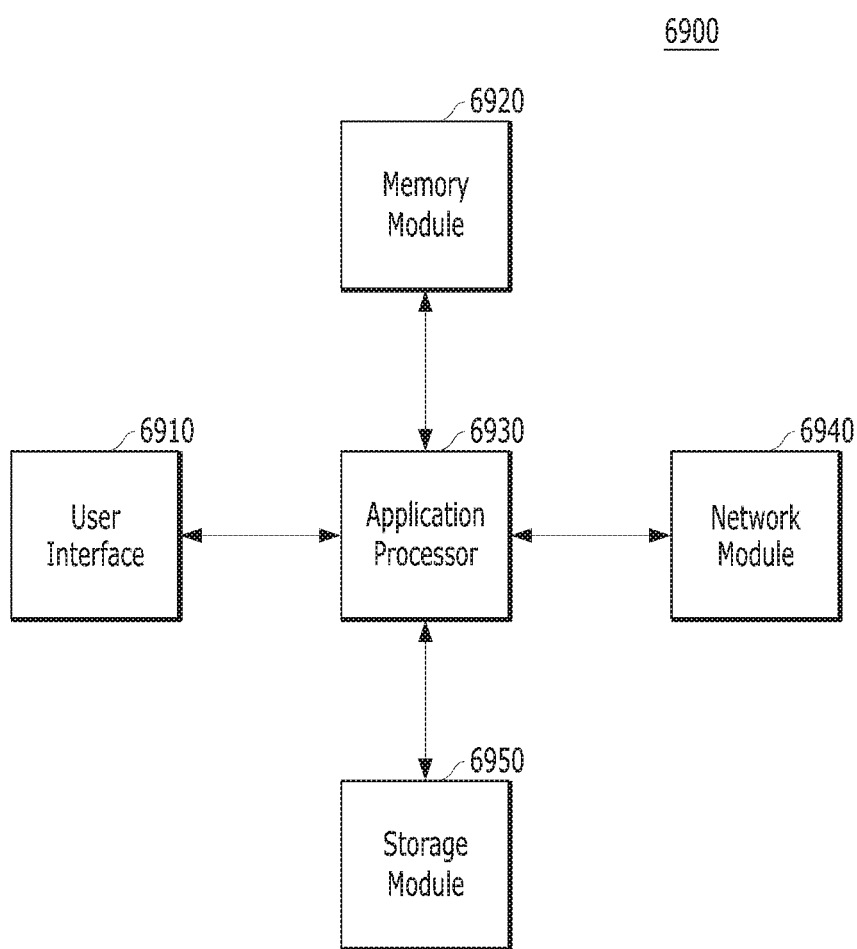

FIG. 16 is a diagram schematically illustrating another example of a data processing system including the memory system in accordance with an embodiment of the present invention. FIG. 16 is a diagram schematically illustrating a user system 6900 including a memory system according to an embodiment of the present invention.

Referring to FIG. 16, the user system 6900 may include a user interface 6910, a memory module 6920, an application processor 6930, a network module 6940, and a storage module 6950.

Specifically, the application processor 6930 may drive components included in the user system 6900, for example, an operating system (OS), and include controllers, interfaces and a graphic engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile random-access memory (RAM) such as a dynamic RAM (DRAM), a synchronous DRAM (SDRAM), a double data rate (DDR) SDRAM, DDR2 SDRAM, DDR3 SDRAM, LPDDR SDARM, LPDDR2 SDRAM or LPDDR3 SDRAM or a nonvolatile RAM such as a phase-change RAM (PRAM), a resistive RAM (ReRAM), a magneto-resistive RAM (MRAM) or a ferroelectric RAM (FRAM). For example, the application processor and the memory module 6920 may be packaged and mounted, based on a Package on Package (PoP) integrated circuit packaging method.

The network module 6940 may communicate with external devices. For example, the network module 6940 may not only support wired communication, but may also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices, particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be implemented as a nonvolatile semiconductor memory device such as a phase-change RAM (PRAM), a magnetic RAM (MRAM), a resistive RAM (ReRAM), a NAND flash, NOR flash and 3D NAND flash, and provided as a removable storage medium such as a memory card or external drive of the user system 6900. The storage module 6950 may correspond to the memory system 110 described with reference to FIG. 1. Furthermore, the storage module may be embodied as an SSD, eMMC and UFS as described above with reference to FIGS. 10 to 15.

In an embodiment, when an actual data loss is larger than a predicted data loss even though the power-off period falls within a predetermined period, the storage module 6950 may perform a background media scan operation on the entire internal storage area thereof, in order to improve reliability.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a monitor.

Furthermore, when the memory system 110 of FIG. 1 is applied to a mobile electronic device of the user system 6900, the application processor 6930 may control overall operations of the mobile electronic device, and the network module 6940 may serve as a communication module for controlling wired and/or wireless communication with an external device. The user interface 6910 may display data processed by the application processor 6930 on a display/touch module of the mobile electronic device, or support a function of receiving data from the touch panel.

In accordance with the present embodiments, it is possible to provide a controller capable of improving the reliability of data stored in a memory device, and an operation method thereof.

Although various embodiments have been described for illustrative purposes, it will be apparent to those skilled in the art that various changes and modifications may be made without departing from the spirit and scope of the invention as defined in the following claims.

What is claimed is:

1. A controller for controlling a memory device, the controller comprising:
    a media scanner configured to perform a media scan operation for a plurality of data chunks one by one in a second cycle, the media scan operation for a data chunk including:
    reading the data chunk from the memory device,
    detecting an error of the read data chunk through a data validation component,
    generating a corrected data chunk of the read data chunk, and
    storing the corrected data chunk in the memory device depending on whether a number of error bits contained in the read data chunk exceeds a predetermined threshold value; and
    a media scan controller configured to change the second cycle to a first cycle according to a power-off period.

2. The controller of claim 1, further comprising:
    a monitoring component configured to monitor whether power is supplied to the memory device, and storing a start time and a cut-off time of the power supply; and
    a period calculator configured to calculate the power-off period based on the start time and the cut-off time of the power supply provided by the monitoring component,
    wherein the data validation component is configured to detect the error included in the data stored in the memory device, and for generating the corrected data corresponding to the stored data.

3. The controller of claim 2,
    wherein the media scan controller changes the second cycle to the first cycle, which is required for completing the media scan operation for the data chunk, according to whether the power-off period exceeds a preset power-off period threshold value, and
    wherein the media scanner performs the media scan operation on all areas of the memory device in which the data are stored, in the first cycle.

4. The controller of claim 3, wherein when the power-off period does not exceed the preset power-off period threshold value, the media scan controller changes the second cycle to the first cycle according to the number of error bits detected through a test read operation.

5. The controller of claim 4, wherein the media scan controller changes the second cycle to the first cycle, which is required for completing the media scan operation on the predetermined size of data according to whether the number of error bits detected through the test read operation exceeds a preset error bit threshold value, and wherein the media scanner performs the media scan operation on all of the areas of the memory device in which the data are stored, in the first cycle.

6. The controller of claim 4, wherein the media scan controller performs the test read operation by reading data which has been recently programmed to the memory device, among the stored data, as the predetermined size of data.

7. The controller of claim 5, wherein the media scan controller decides, as the error bit threshold value, the number of error bits based on the power-off period, a reliability guarantee period, and an error correction threshold value indicating a maximum number of error bits which are correctable from the detected error by the data validation component.

8. The controller of claim 5, wherein when the media scanner completes the media scan operation on all of the areas of the memory device in which the data are stored in the first cycle, the media scan controller rechanges the first cycle to the second cycle, wherein the media scan controller changes the second cycle to a longer cycle than the first cycle, and wherein the media scanner performs the media scan operation in the second cycle.

9. The controller of claim 7, wherein the media scan controller decides a larger value between a decided number of error bits and the lower limit of the error bit threshold value as the error bit threshold value.

10. The controller of claim 7, wherein the reliability guarantee period is decided from requirements of a memory system including the memory device and the controller.

11. An operation method of a controller for controlling a memory device, the operation method comprising:

performing a media scan operation for a plurality of data chunks one by one in a second cycle, the media scan operation for a data chunk comprising:

reading the data chunks from the memory device;

detecting an error of the read data chunk, and generating corrected data of the read data;

storing the corrected data chunk in the memory device according to whether the number of detected error bits contained in the read data chunk exceeds a predetermined threshold value; and changing the second cycle to a first cycle according to a power-off period.

12. The operation method of claim 11, further comprising:

calculating the power-off period by comparing a last start time of power supply to a last cut-off time of power supply.

13. The operation method of claim 12, wherein the changing of the second cycle to the first cycle according to the power-off period comprises changing the second cycle to the first cycle, which is required for completing the media scan operation on the predetermined size of data according to whether the power-off period exceeds a preset power-off period threshold value, and wherein the performing of the media scan operation in the predetermined cycle comprises performing the media scan operation on all areas of the memory device in which the data are stored, in the first cycle.

14. The operation method of claim 13, wherein the changing of the second cycle to the first cycle according to the power-off period comprises changing the second cycle to the first cycle according to the number of error bits detected through a test read operation, when the power-off period does not exceed the preset power-off period threshold.

15. The operation method of claim 14, wherein the changing of the second cycle to the first cycle according to the number of error bits detected through the test read operation comprises changing the second cycle to the first cycle, which is required for completing the media scan operation on the predetermined size of data, according to whether the number of error bits detected through the test read operation exceeds a preset error bit threshold value, and wherein the performing of the media scan operation in the predetermined cycle comprises performing the media scan operation on all of the areas of the memory device in which the data are stored, in the first cycle.

16. The operation method of claim 14, wherein the changing of the predetermined cycle according to the number of error bits detected through the test read operation comprises performing the test read operation by reading data which has been recently programmed to the memory device, among the stored data, as the predetermined size of data.

17. The operation method of claim 15, wherein the changing of the predetermined cycle to the time required for completing the media scan operation on the predetermined size of data, according to whether the number of error bits detected through the test read operation exceeds the preset error bit threshold value, comprises deciding, as the error bit threshold value, the number of error bits based on the power-off period, a reliability guarantee period, and an error correction threshold value indicating a maximum number of error bits which are correctable from the detected error.

18. The operation method of claim 17, wherein the changing of the predetermined cycle to the time required for completing the media scan operation on the predetermined size of data, according to whether the number of error bits detected through the test read operation exceeds the preset error bit threshold value, comprises deciding a larger value between a decided number of error bits and the lower limit of the error bit threshold value as the error bit threshold value.

19. The operation method of claim 17, wherein the reliability guarantee period is decided from requirements of a memory system including the memory device and the controller.

20. A controller for a memory device, the controller being configured to:

perform a media scan operation as a background operation for preventing an occurrence of an uncorrectable error in memory areas of the memory device one by one in a predetermined cycle, wherein the media scan operation for a memory area includes:

reading data of the memory area, detecting an error of the read data, generating corrected data of the read data, and storing the corrected data in a different area of the memory device depending on whether a number of bits contained in the detected error exceeds a predetermined threshold value; and changing the predetermined cycle according to a power-off period.

* * * * *